United States Patent [19]
Daly

[11] 4,047,584
[45] Sept. 13, 1977

[54] BEE-HIVE SCALE

[76] Inventor: Richard T. Daly, Coleman Court, Huntington, N.Y. 11743

[21] Appl. No.: 703,543

[22] Filed: July 8, 1976

[51] Int. Cl.² ............ G01G 19/00; G01G 3/14; G01L 5/12
[52] U.S. Cl. .................. 177/1; 177/145; 177/211; 73/141 A
[58] Field of Search .......... 177/1, 126, 145, 146, 177/148, 2 N; 73/141 A

[56] References Cited
U.S. PATENT DOCUMENTS 1,659,641  2/1928  Smith ................ 177/146
2,522,117  9/1950  Holt et al. ............ 73/141 A Primary Examiner—George H. Miller, Jr.
Attorney, Agent, or Firm—Kane, Dalsimer, Kane, Sullivan and Kurucz

[57] ABSTRACT

A portable bee-hive scale includes a housing, a power source, and a probe having a tongue extending from one end of the probe which is adapted to be removably inserted at predetermined locations in a bee-hive. The probe is designed to respond to the placement of weight on the tongue and a gauge is electrically connected to the probe to read the response. The reading is electrically stored and displayed.

11 Claims, 4 Drawing Figures

BEE-HIVE SCALE

BACKGROUND OF THE INVENTION

Common types of bee-hives include those known as Langstroth-types. These include stacked elements of hive bodies and supers. Frequent readings of both the total weight of the hive and of the individual hive bodies would be of great value to the bee keeper in monotoring the progress in the production of honey and in assisting him to manage and control bee-hive activity. The weight of a honey storage super tells how much honey is stored. The day-to-day change indicates the strength of the "honey flow" and this information permits the keeper to timely add supers or remove them. In preparing the hive for winter, weighing is virtually the only practical means for assuring that stores are sufficient for the entire winter or to determine what corrective or supplemental measures may be necessary.

At present, hives are more or less permanently set upon scales in the apiary. Usually only one hive among many is scale-mounted and the assumption is made that the non-mounted hives are in the same condition indicated on the single scale. It is well known that this is a poor assumption.

A second method involves a two men team, or a man with a tripod and pole using "fish-scales" to actually weigh each hive. This method is expensive and clumsy and doesn't readily show the weight of each hive body.

It is accepted that the bees tend to work each frame in the super fairly symetrically in the direction from front to back and, furthermore, they tend to a lesser degree to work from the center frames to those left and right of center. Secondly, if the edge of a hive body or super is raised to create a gap or a space between the lower edge of that super and the upper edge of the next lowert super and that gap is less than 0.160 inches, the bees will not attempt to crawl through.

It is readily apparent that there is a need in the bee-hive field to provide a small, portable scale that can be used to quickly and efficiently take weighings, as desired, of portions of individual bee-hives and in respect to a large number of individual hives.

SUMMARY OF THE INVENTION

With the above background in mind, it is among the primary objective of the present invention to provide a small portable bee-hive scale which is adapted to be removably placed at different points in a bee-hive to weigh the different portions of a hive and to provide means for storing and displaying the weights as desired. The scale is adapted to be easily moved from one hive to another so that relative weights of different hives can be read, stored, and displayed as desired.

In order to measure the total weight above any hive body, that part of the hive to be measured is tilted slightly forward to create a small gap along its lower rear edge. A force-measuring probe is inserted into the gap midway along the length and allowed to assume the weight of the hive born by the edge. Due to the symmetry of the contents, in view of the activities of the bees as described above, it can be assumed that one half of the total weight is supported by the force-measuring probe. This weight is than mechanically and electrically recognized by the scale and stored and displayed in a desired fashion.

In summary, the portable bee-hive scale is provided with a housing, a power source, and a probe having a tongue extending from one end of the probe and adapted to be removably inserted at predetermined locations in a bee-hive. Reaction means is on the probe responsive to placement of weight on the tongue. Gauge means is electrically connected to the probe to read the response of the reaction means. Storage and display means in the housing is electrically connected to the gauge means. Control means selectively records, stores and displays the weight on the tongue as desired.

With the above objectives among others in mind, reference is had to the attached drawings.

DESCRIPTION OF THE PREFERRED EMBODIMENT

Figure 1:
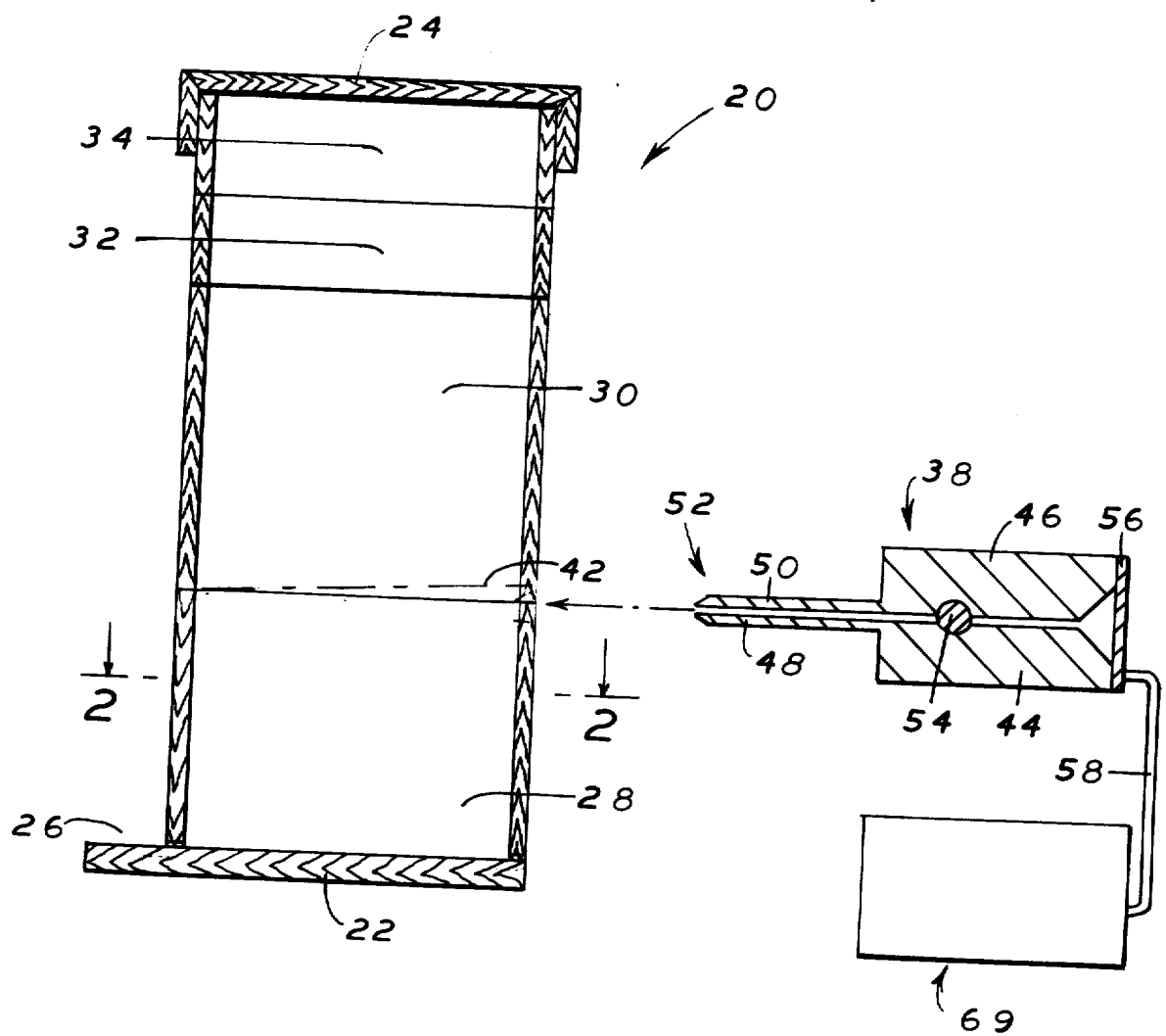
FIG. 1 is a sectional side elevation view of a bee-hive and the probe of the apparatus to be inserted therein with the position of portions of the bee-hive when the probe is inserted therein shown in phantom.
Figure 2:
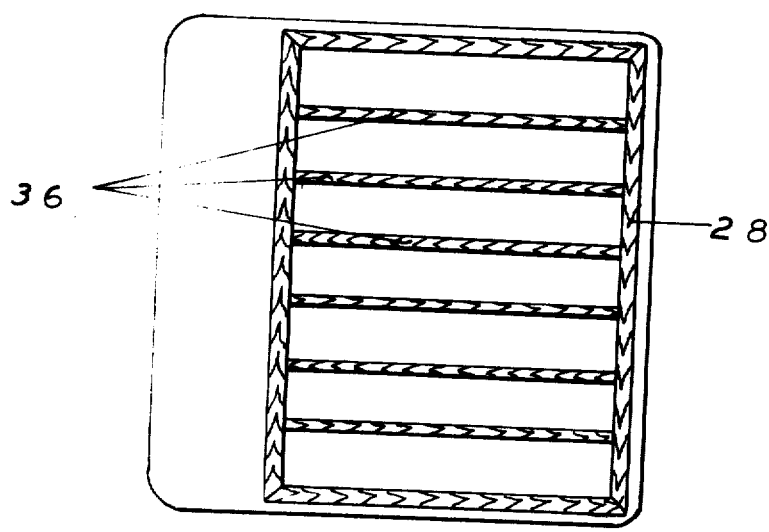
FIG. 2 is a sectional top view of the bee-hive.

FIGS. 1 and 2 show a conventional bee-hive 20 of the type commonly identified as a Langstroth-type hive. The hive 20 includes a bottom board 22 to close off the bottom of the hive and a hive outer cover 24 to close off the top. An entrance 26 is located near the bottom of the front of the hive. In stacked relationship within the hive, from bottom to top, are a first hive body 28, a second hive body 30, a first honey super 32 and a second honey super 34. The first hive body generally acts as a brood chamber and the second hive body generally acts as a brood chamber and food storage chamber.

As will be noted from FIG. 2, the hive body 28, as well as the hive body 30, include an open top and an open bottom and contain interior comb frames 36.

When it is desired to weigh one of the hive bodies or a super, all that is necessary is that the probe 38 of scale 40 be inserted between two of the stacked members to shift their position such as shown by the phantom line 42 in FIG. 1. Thereafter the weight upon the probe will result in a reading.

Probe 38 includes a bottom base 44 and a top base 46. The bottom base has a lateral projection 48 extending from one end and the top base 46 has a lateral projection 50 extending from one end so that projections 48 and 50 are in alignment to form tongue 52. Projections 50 and 48 are spaced with a predetermined small gap therebetween. The thickness of the projections 48 and 50 is limited so that less than 0.160 inches represents the thickness of tongue 52. Consequently, when tongue 52 is inserted between two of the stacked portions of the hive such as bodies 28 and 30 the resultant gap between the bodies will be less than 0.160 inches. This avoids any undue disturbance of the hive structure in general or of the bees and their activity with respect to the hive. It will be noted that this result is facilitated by the fact that the front edges of the two separated bodies still remain in contact.

The bases 44 and 46 are pivoted about a fulcrum 54 which seats in a pair of opposing aligned recesses in the bases. A strain plate 56 has an attached strain gauge which is mounted to the rear ends of base portions 44 and 46. An electrical lead 58 extends from the plate and attached gauge to the storage, display, power and control unit in an accompanying housing 69.

The tongue 52 is inserted into the gap between two adjacent bodies and assumes one half of the weight of the hive 20 above. The closing force on the tongue exerted by the weight is transmitted by the fulcrum 54 to the strain plate 56. The thin sheet-like strain plate undergoes tensile strain which is measured by an attached conventional foil or wire strain gauge.

Figure 3:
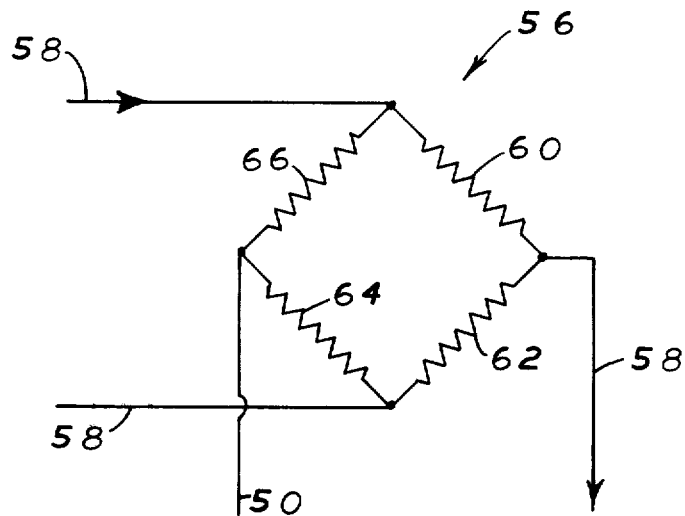
FIG. 3 is a schematic view of the strain gauge portion of the circuitry of the scale.
Figure 4:
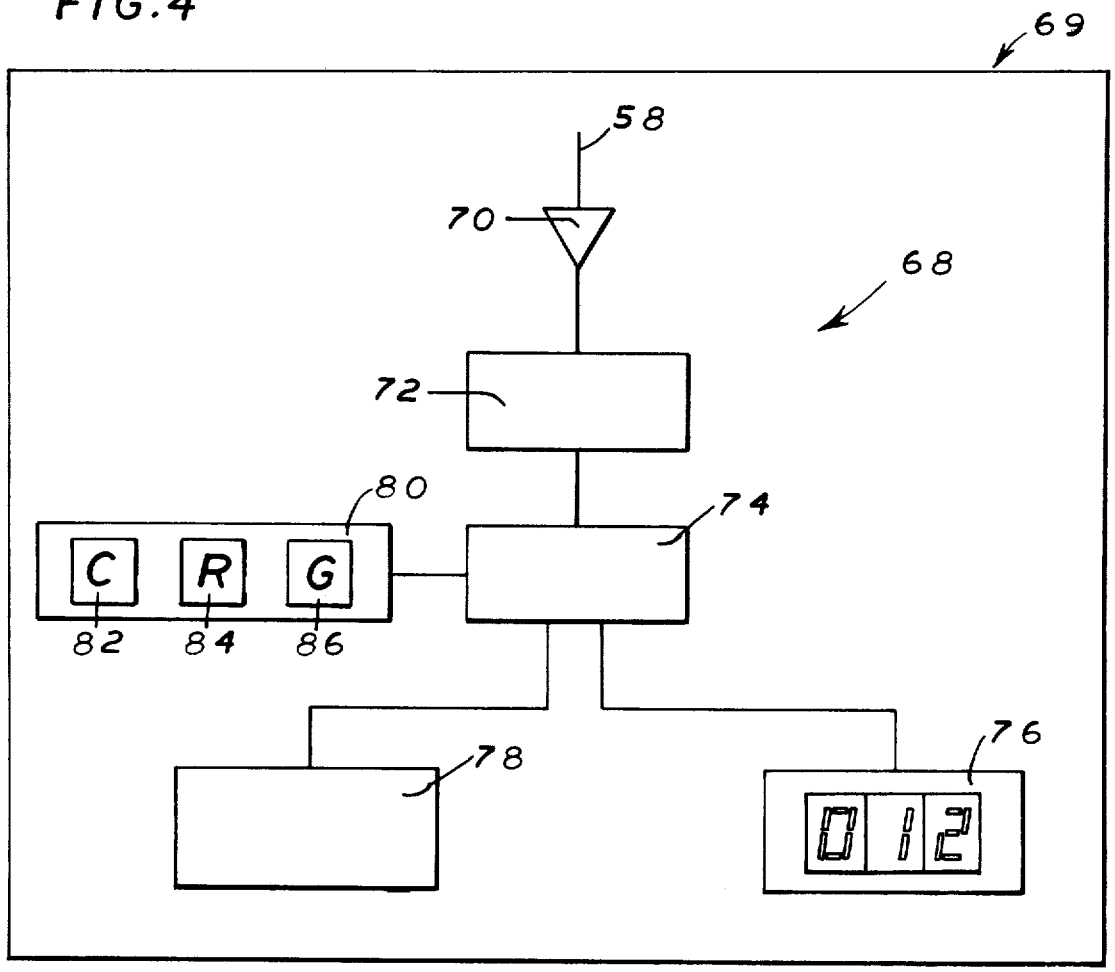
FIG. 4 is a block diagram of the portion of the circuitry for storing, displaying and controlling of the signal received from the strain gauge.

Power from a conventional power source such as a battery is received through electrical connection 58 which also serves to send the return strain gauge signal back to the storage and display unit. The significant strain gauge circuitry 56 is depicted in FIG. 3. Power is received through lead 58 and the strain gauge resistance 60 is balanced by the three remaining resistors 62, 64 and 66 which forms a complete bridge and results in a strain gauge signal extending back out through leads 58 to the storage and display unit 68 as depicted in block form in FIG. 4.

The strain gauge signal is amplified by op-amp 70 and is then digitized by A/D convertor 72. It is then routed by conventional logic 74 to display 76 and memory 78 of a conventional nature.

An appropriate manually operable keyboard 80 is provided to control the memory and display circuitry.

Before inserting probe 38 into the hive body gap, the clear button 82 should be pressed. This zero's the display and stores the no-load bridge unbalance signal in memory 78. This is accomplished in a conventional manner and includes an algebraic sign change as conventionally utilized.

Tongue 52 is then inserted and assumes one half of the weight of the portion of hive 20 above the tongue. The read button 84 on keyboard 80 is then pressed. The logic circuitry 74 substracts the contents of the memory 78 from the bridge signal and displays the result on the visual display 76. It also adds the results to memory 78. The digital display is the actual weight, the logic 74 includes appropriate circuitry to take care of the one half factor which is the actual weight absorbed by the tongue as described above.

If the next lower super or hive body net weight is desired, a gap is created on the lower edge of that body, tongue 52 is inserted, and the read button 84 is pressed. The logic circuitry 74 substracts the contents of memory 78 from the bridge 70 and the result displayed represents the net weight. This result is also added to memory 78. A gross button 86 is also provided on the keyboard which when pressed produces a circuitry result whereby the contents of memory 78 are displayed on visual display 76.

The scale can measure either total over lying hive weight or the net weight of each super and hive body in downward sequence without opening the hive and with minimal disturbance to the bees and the bee keeper.

The circuitry employed in the logic, memory and display unit is of a conventional type such as that employed in small pocket calculators. The overall result is a compact portable unit which can be moved from hive to hive and positioned in different locations in the hive in order to determine weights at a wide variety of locations.

Thus the several aforenoted objects and advantages are most effectively attained. Although several somewhat preferred embodiments have been disclosed and discribed in detail herein, it should be understood that this invention is in no sense limited thereby and its scope is to be determined by that of the appended claims.

I claim:

1. A portable bee-hive scale comprising; a housing and power source, a probe having a tongue extending from one end and adapted to be removably inserted at predetermined locations in a bee-hive, reaction means on the probe responsive to weight on the tongue, gauge means on the probe to read the response of the reaction means and provide a representative electrical signal, logic, memory and display means in the housing electrically connected to the gauge means to receive and process the signal therefrom, and control means to selectively operate the memory, logic and display means to indicate a desired weight.

2. The invention in accordance with claim 1 wherein the bee-hive is of the type containing a predetermined number of hive bodies and supers in stacked relationship with access to the stacks so that the probe can be inserted between any two adjacent hive bodies and supers and obtain a reading of the weight exerted on the probe.

3. The invention in accordance with claim 1 wherein the probe includes a pair of opposing bases separated by a fulcrum, each base having a projection extending from one end with the projections in alignment and spaced to form a small gap therebetween, a strain plate and gauge attached to the opposite ends of the bases so that when weight is applied to the tongue formed by the space projections the bases will tend to rotate about the fulcrum thereby applying a strain to the strain plate and resulting in a reading on the strain gauge, the electrical connection between the strain gauge and the memory, logic and display means permitting processing of the signal from the gauge to indicate the weight on the tongue.

4. The invention in accordance with claim 3 wherein the outer diameter of the tongue formed by the pair of aligned projections on the probe is less than 0.160 inches.

5. The invention in accordance with claim 1 wherein the gauge means includes a strain gauge resistor in connection with three balancing resistors in the form of a completed electrical bridge, the bridge being electrically connected to a power source and having an output electrical connection for transmitting the strain signal from the gauge to the logic, memory and display means electrically connected therewith.

6. The invention in accordance with claim 5 wherein the control means permits the memory means to store the desired weight while the probe is inserted at a second different location in the bee-hive whereupon the logic means substracts the contents of the memory means from the strain signal automatically to permit the display of the net weight.

7. A method of weighing bee-hives comprising; periodically inserting a portable scale instrument including a probe at predetermined points in the hive, and measuring the weight supported by the probe, the hive being of the type containing layers of hive bodies and supers in stacked relationship and the probe including an extending tongue which is inserted between two adjacent bodies and supers to indicate the weights supported by the tongue of the hive bodies and supers above it, and the probe including a strain gauge responsive to the weight on the tongue to indicate the strain on the tongue and to produce an electrical signal corresponding to the strain on the tongue.

8. The invention in accordance with claim 7 wherein the signal from the strain gauge is electrically transferred into a reading of the weight supported by the probe and is then stored for later recovery and display.

9. The invention in accordance with claim 8 wherein after the weight reading has been stored, the process is repeated with the probe inserted at a different location in the hive and the difference between the new weight reading and the stored weight reading is automatically determined to indicate net weight.

10. The invention in accordance with claim 8 wherein the signal from the strain gauge is representative of one half of the weight supported by the tongue of the probe and is transformed by logic circuitry into a reading of full weight supported by the probe and is then stored in electrical circuit memory for visual display by operation of appropriate electrical controls upon demand.

11. The invention in accordance with claim 10 wherein the outer diameter of the tongue is less than 0.160 inches.

* * * * *